United States Patent
Ahn et al.

(10) Patent No.: US 9,246,652 B2
(45) Date of Patent: Jan. 26, 2016

(54) CONTROL CHANNEL MONITORING METHOD AND DEVICE

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 14/130,660

(22) PCT Filed: Jul. 2, 2012

(86) PCT No.: PCT/KR2012/005239
§ 371 (c)(1),
(2), (4) Date: Jan. 2, 2014

(87) PCT Pub. No.: WO2013/005960
PCT Pub. Date: Jan. 10, 2013

(65) Prior Publication Data
US 2014/0133590 A1  May 15, 2014

Related U.S. Application Data

(60) Provisional application No. 61/504,229, filed on Jul. 3, 2011.

(51) Int. Cl.
| | |
|---|---|
| *H04L 5/00* | (2006.01) |
| *H04W 48/12* | (2009.01) |
| *H04L 27/26* | (2006.01) |
| *H04W 72/00* | (2009.01) |
| *H04L 1/18* | (2006.01) |

(52) U.S. Cl.
CPC ............ *H04L 5/0053* (2013.01); *H04L 5/0007* (2013.01); *H04L 5/0051* (2013.01); *H04L 27/2601* (2013.01); *H04W 48/12* (2013.01); *H04L 1/1861* (2013.01); *H04W 72/00* (2013.01)

(58) Field of Classification Search
CPC . H04L 27/2601; H04L 5/0053; H04L 1/1861; H04W 48/12; H04W 72/00; H04W 24/00
USPC ................................................. 370/241, 252
See application file for complete search history.

(56) References Cited

U.S. PATENT DOCUMENTS

| | | | |
|---|---|---|---|
| 2010/0165847 A1* | 7/2010 | Kamuf et al. | 370/241 |
| 2010/0246456 A1 | 9/2010 | Suo et al. | |
| 2011/0044250 A1 | 2/2011 | Han et al. | |
| 2011/0170496 A1* | 7/2011 | Fong et al. | 370/329 |
| 2011/0235597 A1* | 9/2011 | Montojo et al. | 370/329 |

(Continued)

FOREIGN PATENT DOCUMENTS

| | | |
|---|---|---|
| KR | 10-2010-0092475 A | 8/2010 |
| KR | 10-2011-0030372 A | 3/2011 |

(Continued)

*Primary Examiner* — Chi H Pham
*Assistant Examiner* — Robert Lopata
(74) *Attorney, Agent, or Firm* — Birch, Stewart, Kolasch & Birch, LLP (57) ABSTRACT

The present invention relates to a method and device for monitoring a control channel in a wireless communication system. A terminal receives a UE-specific reference signal (URS) from at least one extended subframe, and monitors a control channel in an extended control channel region of the at least one extended subframe. The control channel is demodulated using the URS.

11 Claims, 6 Drawing Sheets subframe (A)

subframe (B)

(56) References Cited

U.S. PATENT DOCUMENTS

| | | | |
|---|---|---|---|
| 2011/0249633 A1* | 10/2011 | Hong | H04L 5/0053 370/329 |
| 2012/0108254 A1 | 5/2012 | Kwon et al. | |
| 2012/0155414 A1 | 6/2012 | Noh et al. | |
| 2012/0250642 A1* | 10/2012 | Qu et al. | 370/329 |
| 2013/0003604 A1* | 1/2013 | Blankenship | H04L 5/0053 370/255 |
| 2013/0003663 A1* | 1/2013 | Blankenship | H04L 5/0053 370/329 |
| 2013/0039284 A1* | 2/2013 | Marinier et al. | 370/329 |
| 2014/0105150 A1* | 4/2014 | Kim | H04B 7/0417 370/329 |

FOREIGN PATENT DOCUMENTS

| | | |
|---|---|---|
| WO | WO 2009/070964 A1 | 6/2009 |
| WO | WO 2010/082752 A2 | 7/2010 |
| WO | WO 2010/151050 A2 | 12/2010 |
| WO | WO 2011/017467 A2 | 2/2011 |
| WO | WO 2011/037439 A2 | 3/2011 |

* cited by examiner

CONTROL CHANNEL MONITORING METHOD AND DEVICE

CROSS REFERENCE TO RELATED APPLICATIONS

This application is the National Phase of PCT/KR2012/005239 filed on Jul. 02, 2012,which claims priority under 35 U.S.C. 119(e) to U.S. Provisional Application No. 61/504,229 filed on Jul. 03, 2011, all of which are hereby expressly incorporated by reference into the present application.

BACKGROUND OF THE INVENTION

1. Field of the Invention

The present invention concerns wireless communications, and more specifically, to methods and apparatuses for monitoring a control channel in a wireless communication system.

2. Related Art

3GPP (3rd Generation Partnership Project) TS (Technical Specification) Release-8-based LTE (Long Term Evolution) is a potent, next-generation mobile communication standard. Recently, LTA-A (LTE-advanced) based on 3GPP TS Release 10 that supports multiple carriers is being standardized.

As set forth in 3GPP TS 36.211 V10.2.0 (2011-06) "Evolved Universal Terrestrial Radio Access (E-UTRA); Physical Channels and Modulation (Release 10)," physical channels, in 3GPP LTE/LTE-A, may be classified into PDSCH (Physical Downlink Shared Channel) and PDCCH (Physical Downlink Control Channel) that are downlink channels and PUSCH (Physical Uplink Shared Channel) and PUCCH (Physical Uplink Control Channel) that are uplink channels.

The PDCCH is a downlink control channel used for uplink scheduling and downlink scheduling. The PDCCH is detected using blind decoding in a specific region of a sub-frame.

As standardization is underway, the amount and type of downlink control information diversify, and as a plurality of serving cells are introduced in LTE-A, use of PDCCH only is encountered with a number of limits. This is why the PDCCH is transmitted limited to a specific region, multiplexing between terminals is not supported.

SUMMARY OF THE INVENTION

The present invention provides a method and apparatus for monitoring a control channel.

In an aspect, a method of monitoring a control channel by a terminal in a wireless communication system is provided. The method comprises receiving configuration information indicating at least one extended sub-frame among a plurality of sub-frames; receiving a URS (UE-specific reference signal) in the at least one extended sub-frame; and monitoring a control channel in an extended control channel region of the at least one extended sub-frame, wherein the control channel is demodulated using the URS.

The at least one extended sub-frame may include a plurality of OFDM (orthogonal frequency division multiplexing) symbols, wherein the extended control channel region may be positioned from a first OFDM symbol of the plurality of OFDM symbols.

The URS may be received only in the extended control channel region.

In another aspect, a terminal of monitoring a control channel in a wireless communication system is provided. The terminal comprises an RF (radio frequency) unit transmitting and receiving a radio signal; and a processor connected with the RF unit, wherein the processor receives configuration information indicating at least one extended sub-frame of a plurality of sub-frames, receives a URS UE-specific reference signal) in the at least one extended sub-frame, and monitors a control channel in an extended control channel region of the at least one extended sub-frame, wherein the control channel is demodulated using the URS.

An extended control channel that may be allocated more flexibly than the base station is transmitted, and the terminal may receive the extended control channel.

DESCRIPTION OF EXEMPLARY EMBODIMENTS

The User Equipment (UE) may be stationary or mobile and may also be referred to as MS(mobile station), MT(mobile terminal), UT(user terminal), SS(subscriber station), Terminal(wireless device), PDA(personal digital assistant), wireless modem, handheld device, etc.

The base station (BS) is typically a fixed station that communicates with a terminal and may also be referred to as eNB(evolved-NodeB), BTS(Base Transceiver System), Access Point, etc.

Hereinafter, the present invention is described based on 3GPP(3rd Generation Partnership Project) TS(Technical Specification) Release 8-based 3GPP LTE(long term evolution) or 3GPP TS Release 10-based 3GPP LTE-A. However, this is merely an example, and the present invention may also apply to various wireless communication networks.

In 3GPP LTE-A, a terminal may be served by a plurality of serving cells. The serving cells may be separated into primary cells and secondary cells. The primary cell operates at a primary frequency and is designated as one when the terminal performs an initial connection establishment process, initiates a connection re-establishment process, or performs handover. The primary cell is also referred to as a reference cell. A secondary cell operates at a secondary frequency and may be configured after an RRC (Radio Resource Control) connection is established and may be used to provide an additional radio resource. At least one primary cell is always configured, and secondary cells may be added/modified/released by upper layer signaling (e.g., RRC message).

The CI (cell index) of the primary cell may be fixed. For example, the lowest CI may be the CI of the primary cell. Hereinafter, the CI of the primary cell is 0, and the CIs of the secondary cells are sequentially assigned from 1 and its subsequent numbers.

Figure 1:
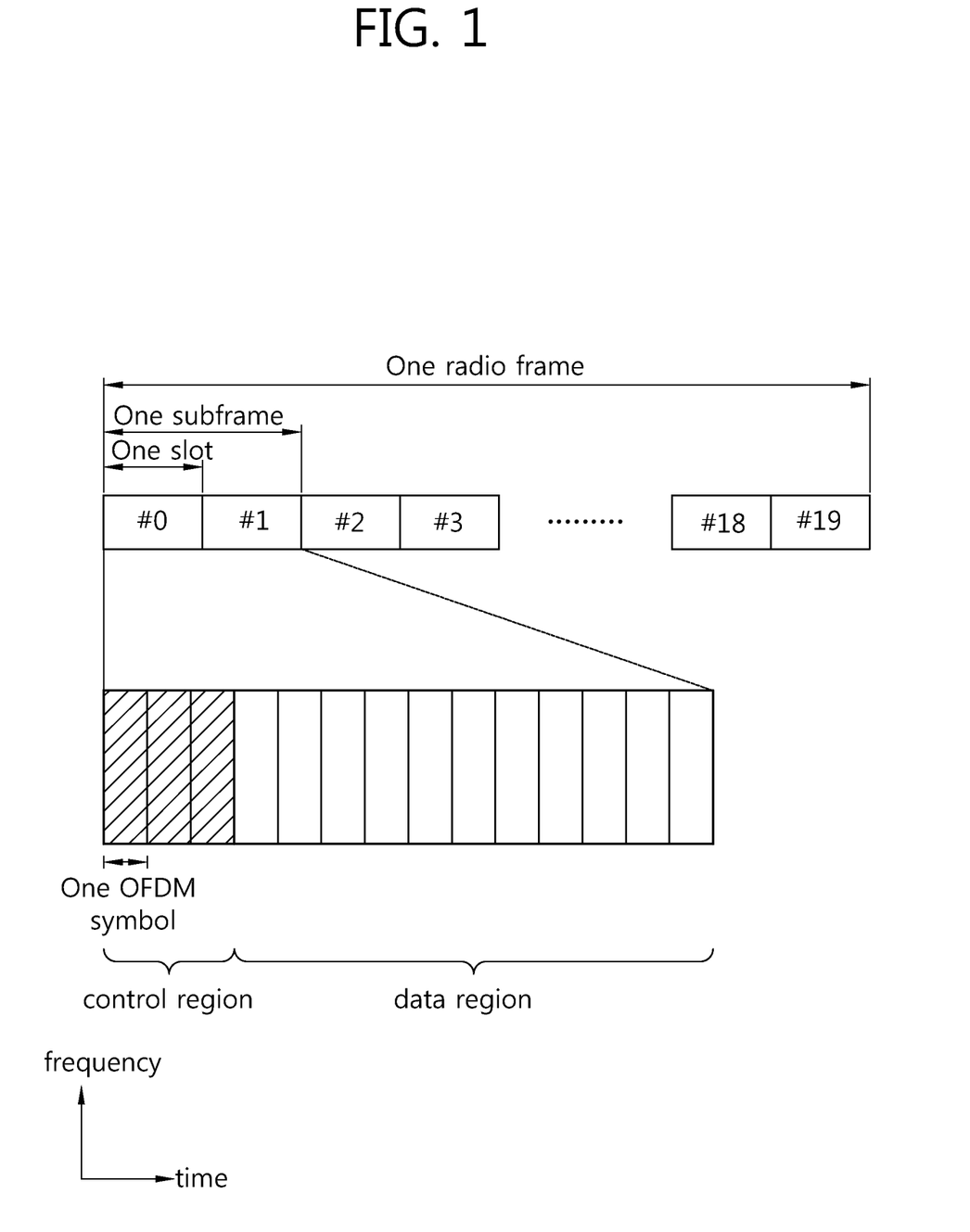
FIG. 1 shows the structure of a downlink radio frame in 3GPP LTE-A.

FIG. 1 shows the structure of a downlink radio frame in 3GPP LTE. This may refer to 3GPP TS 36.211 V10.2.0

(2011-06) "Evolved Universal Terrestrial Radio Access (E-UTRA); Physical Channels and Modulation (Release 10)," Ch. 6.

A radio frame includes ten sub-frames indexed 0 to 9. One sub-frame includes two consecutive slots. The time taken for one sub-frame to be transmitted is a TTI (transmission time interval). For example, the length of one sub-frame may be 1 ms, and the length of one slot may be 0.5 ms.

One slot may include, in the time domain, a plurality of OFDM (orthogonal frequency division multiplexing) symbols. The term "OFDM symbol" is used merely to represent one symbol period in the time domain because 3GPP LTE adopts OFDMA (orthogonal frequency division multiple access) on downlink, and thus, this does not limit the type and name of multiple access schemes. For example, the OFDM symbol may also be referred to as SC-FDMA (single carrier-frequency division multiple access) symbol or symbol period.

One slot includes seven OFDM symbols for purposes of description. However, depending on the length of a CP (Cyclic Prefix), the number of OFDM symbols included in one slot may vary. According to 3GPP TS 36.211 V10.2.0, one slot includes seven OFDM symbols in a normal CP and six OFDM symbols in an extended CR The resource block (RB) is a basis for resource allocation and includes a plurality of sub-carriers in one slot. For example, in case one slot includes seven OFDM symbols in the time domain and one resource block includes 12 sub-carriers in the frequency domain, the resource block may include 7×12 resource elements (REs).

The DL (downlink) sub-frame is separated into a control region and a data region in the time domain. The control region includes up to four first OFDM symbols in the first slot in the sub-frame. However, the number of OFDM symbols included in the control region may vary. In the control region, a PDCCH (Physical Downlink Control Channel) and other control channels are allocated, and in the data region, a PDSCH is allocated.

As set forth in 3GPP TS 36.211 V10.2.0, physical channels, in 3GPP LTE/LTE-A, may be separated into data channels such as a PDSCH (Physical Downlink Shared Channel) and a PUSCH (Physical Uplink Shared Channel) and control channels, such as a PDCCH (Physical Downlink Control Channel), a PCFICH(Physical Control Format Indicator Channel), a PHICH(Physical Hybrid-ARQ Indicator Channel) and a PUCCH(Physical Uplink Control Channel).

The PCFICH which is transmitted in the first OFDM symbol of the sub-frame carries a CIF (control format indicator) regarding the number of OFDM symbols (i.e., size of the control region) used for transmission of control channels in the sub-frame. The terminal receives the CIF over the PCFICH and then monitors the PDCCH.

Unlike the PDCCH, the PCFICH is transmitted through a fixed PCFICH resource of the sub-frame without using blind decoding.

The PHICH carries an ACK (positive-acknowledgement)/NACK (negative-acknowledgement) signal for uplink HARQ (hybrid automatic repeat request). The ACK/NACK signal for UL (uplink) data over the PUSCH transmitted by the terminal is transmitted over the PHICH.

The PBCH (Physical Broadcast Channel) is transmitted through first four OFDM symbols in the second slot of the first sub-frame of the radio frame. The PBCH carries system information necessary for the terminal to communicate with the base station. The system information transmitted through the PBCH is referred to as MIB (master information block).

In comparison, the system information transmitted over the PDSCH indicated by the PDCCH is referred to as SIB (system information block).

The control information transmitted through the PDCCH is referred to as downlink control information (DCI). The DCI may include resource allocation of the PDSCH (also referred to as DL (downlink) grant), resource allocation of the PUSCH (also referred to as UL (uplink) grant), set of transmit power control commands for individual UEs in any UE group and/or VoIP (Voice over Internet Protocol) activation.

In 3GPP LTE, blind decoding is used for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel.

After determining the PDCCH format according to the DCI to be sent to the terminal, the base station adds a CRC (Cyclic Redundancy Check) to the DCI and masks the CRC with a unique identifier (which is referred to as RNTI (Radio Network Temporary Identifier)) depending on the owner or purpose of the PDCCH.

The control region in the sub-frame includes a plurality of CCEs (control channel elements). The CCE is a basis for logical allocation which is used to provide a PDCCH with a coding rate according to the state of a radio channel and corresponds to a plurality of REGs (resource element groups). The REG includes a plurality of resource elements. According to the relationship between the number of CCEs and the coding rate provided by the CCEs, the format of the PDCCH and the possible number of bits of the PDCCH are determined.

One REG includes four REs and one CCE includes nine REGs. In order to configure one PDCCH, $\{1, 2, 4, 8\}$ CCEs may be used, and each element of $\{1, 2, 4, 8\}$ is referred to as a CCE aggregation level.

The number of CCEs used for transmission of the PDCCH is determined by the base station according to the channel state. For example, for a terminal having a good downlink channel state, one CCE may be used for transmitting the PDCCH. For a terminal having a poor downlink channel state, eight CCEs may be used for transmitting the PDCCH.

A control channel constituted of one or more CCEs performs interleaving on a per-REG basis, and after a cell ID (identifier)-based cyclic shift is performed, it is mapped with a physical resource.

Figure 2:
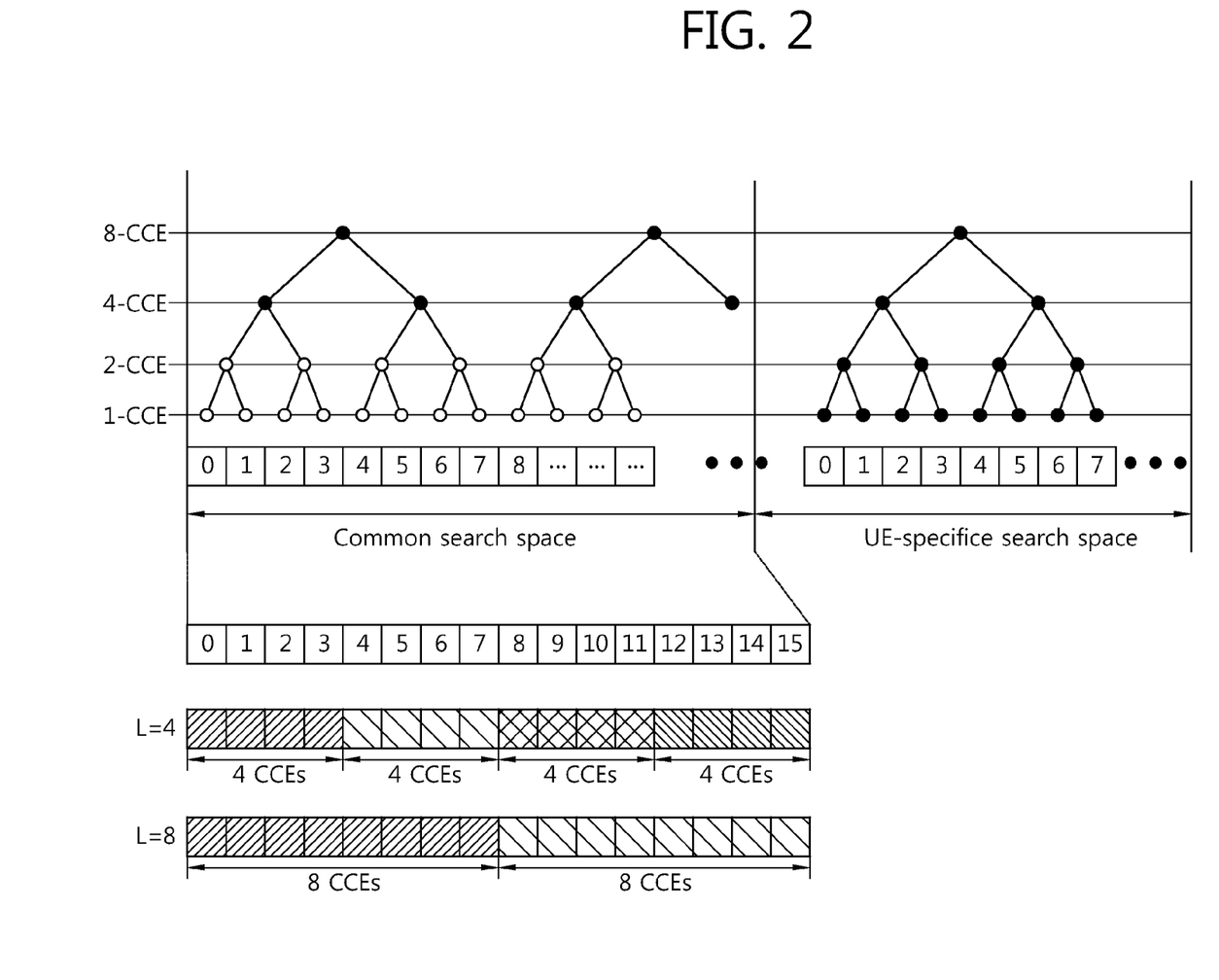
FIG. 2 shows an example of monitoring a PDCCH.

FIG. 2 shows an example of monitoring a PDCCH. For this, refer to 3GPP TS 36.213 V10.2.0 (2011-06), Ch. 9.

In 3GPP LTE, blind decoding is used for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel. The terminal is not aware of what CCE aggregation level or DCI format its PDCCH uses at what position in the control region.

A plurality of PDCCHs may be transmitted in one sub-frame. The terminal monitors a plurality of PDCCHs at every sub-frame. Here, the term "monitoring" refers to the terminal attempting to decode a PDCCH to be monitored, per the format of the PDCCH.

In 3GPP LTE, a search space is used for reducing load posed by blind decoding. The search space may be CCEs' monitoring set for a PDCCH. The terminal monitors the PDCCH in the search space.

The search space includes a common search space and a UE-specific search space. The common search space is a space for searching a PDCCH having common control information and consists of 16 CCEs, CCE index 0 to 15, and supports PDCCHs having a CCE aggregation level of {4, 8}. However, a PDCCH (DCI formats 0 and 1A) for carrying UE-specific information may be transmitted even in the common search space. The UE-specific search space supports PDCCHs having a CCE aggregation level of {1, 2, 4, 8}.

The following table represents the number of PDCCH candidates that are monitored by the terminal.

TABLE 1

| Search Space Type | Aggregation level L | Size [in CCEs] | Number of PDCCH candidates | DCI formats |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of a search space is determined by Table 1 above, and the start point of a search space is defined differently for each of the common search space and UE-specific search space. The start point of the common search space is fixed regardless of any sub-frame, but the start point of the UE-specific search space may vary per sub-frame depending on the terminal identifier (for example, C-RNTI), CCE aggregation level and/or slot number in a radio frame. In case the start point of the UE-specific search space is positioned in the common search space, the UE-specific search space and the common search space may overlap.

In an aggregation level $L \in \{1,2,3,4\}$, search space $S^{(L)}_k$ is defined as a set of PDCCH candidates. The CCE corresponding to PDCCH candidate m in search space $S^{(L)}_k$ is given as follows:

$$L \cdot \{(Y_k+m') \bmod \lfloor N_{CCE,k}/L \rfloor\}+i \quad \text{[Equation 1]}$$

Here, $i=0,1,\ldots,L-1$, $m=0,\ldots,M^{(L)}-1$, and $N_{CCE,k}$ is the total number of CCEs that may be used for transmission of PDCCHs in the control region of sub-frame k. The control region includes a set of CCEs numbered from 0 to $N_{CCE,k}-1$. $M^{(L)}$ is the number of PDCCH candidates in CCE aggregation level L in the given search space.

If a CIF (carrier indicator field) is configured in the terminal, $m'=m+M^{(L)}n_{cif}$. $n_{cif}$ is a CIF value.

In the common search space, $Y_k$ is set as 0 for two aggregation levels, L=4 and L=8.

In the UE-specific search space of aggregation level L, variable $Y_k$ is defined as follows:

$$Y_k=(A \cdot Y_{k-1}) \bmod D \quad \text{[Equation 2]}$$

Here, $Y_{-1}=n_{RNTI} \neq 0$, A=39827, D=65537, $k=\text{floor}(n_s/2)$, and $n_s$ is a slot number in the radio frame.

In 3GPP LTE, transmission of a downlink transmission block is performed in a pair of PDCCH and PDSCH. Transmission of an uplink transmission block is performed in a pair of PDCCH and PUSCH. For example, the terminal receives a downlink transmission block over a PDSCH indicated by a PDCCH. The terminal receives a downlink resource allocation over a PDCCH by monitoring the PDCCH in a downlink sub-frame. The terminal receives a downlink transmission block over a PDSCH indicated by the downlink resource allocation.

Figure 3:
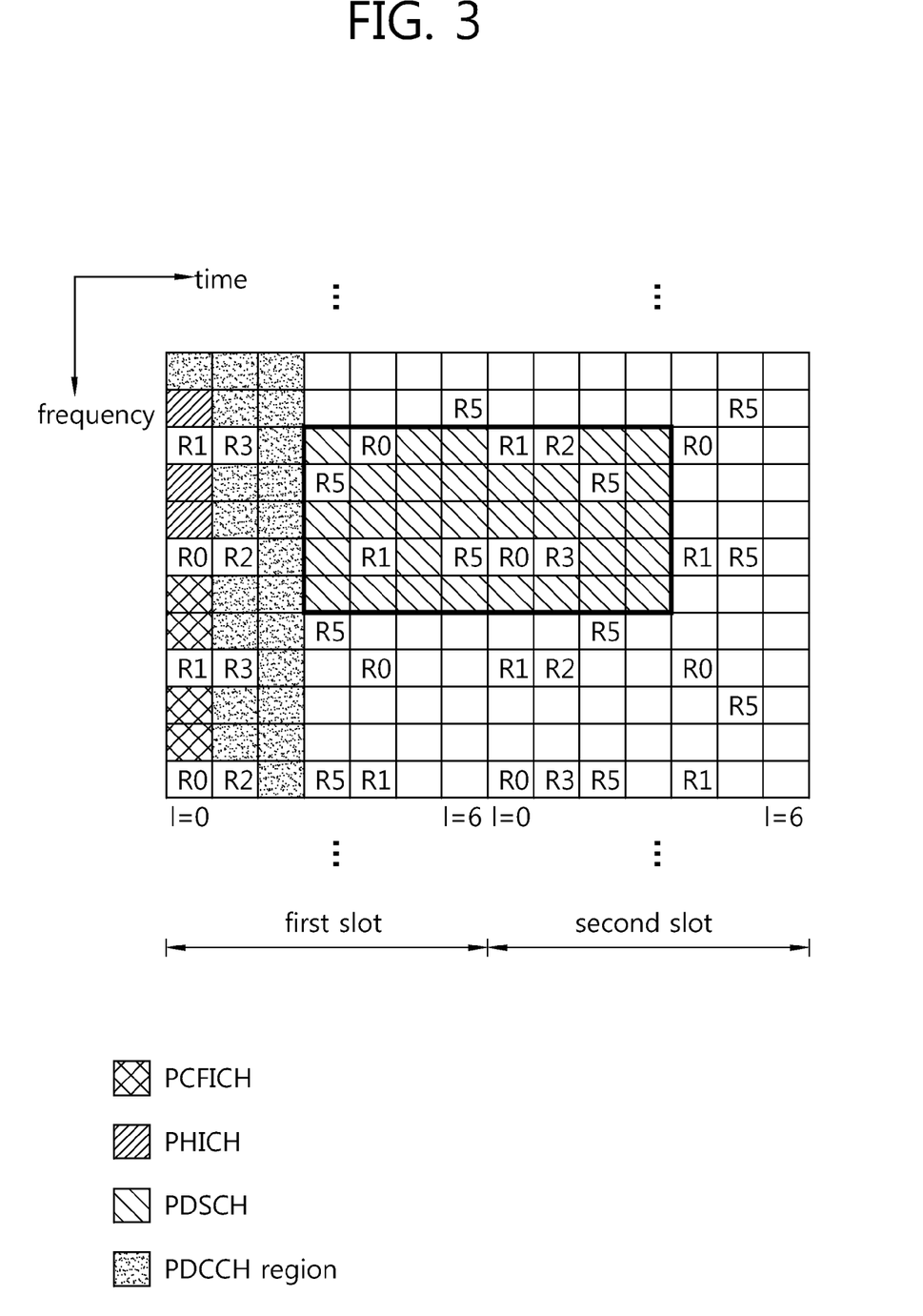
FIG. 3 shows an example of a downlink sub-frame in 3GPP LTE-A.

FIG. 3 shows an example of a downlink sub-frame in 3GPP LTE-A.

The control region includes first three OFDM symbols and the data region where a PDSCH is transmitted includes the remaining OFDM symbols.

In the control region, a PCFICH, a PHICH, and/or a PDCCH are transmitted. The CIF in the PCFICH indicates three OFDM symbols. In the control region, the region other than resources where the PCFICH and/or PHICH are transmitted becomes a PDCCH region for monitoring the PDCCH.

In the sub-frame, various reference signals are transmitted as well.

The CRS (cell-specific reference signal) may be received by all of the terminals in the cell and is transmitted over the whole downlink band. In the drawings, 'R0' denotes an RE (resource element) where a CRS for a first antenna port is transmitted, 'R1' denotes an RE where a CRS for a second antenna port is transmitted, 'R2' denotes an RE where a CRS for a third antenna port is transmitted, and 'R3' denotes an RE where a CRS for a fourth antenna port is transmitted.

The RS sequence $r_{l,ns}(m)$ for a CSR is defined as follows:

$$r_{l,ns}(m) = \frac{1}{\sqrt{2}}(1-2 \cdot c(2m)) + j\frac{1}{\sqrt{2}}(1-2 \cdot c(2m+1)) \quad \text{[Equation 3]}$$

Here, $m=0,1,\ldots,2N_{maxRB}-1$, $N_{maxRB}$ is the maximum number of RBs, $n_s$ is a slot number in the radio frame, and l is an OFDM symbol number in the slot.

The pseudo-random sequence c(i) is defined by a gold sequence whose length is 31 as follows:

$$c(n)=(x_1(n+Nc)+x_2(n+Nc))\bmod 2 \; x_1(n+31)=(x_1(n+3)+ x_1(n))\bmod 2 \; x_2(n+31)=(x_2(n+3)+x_2(n+2)+x_2(n+1)+x_2(n))\bmod 2 \quad \text{[Equation 4]}$$

Here, Nc=1600, and the first m-sequence is initialized as $x_1(0)=1$, $x_1(n)=0$, $m=1,2,\ldots,30$.

The second m-sequence is initialized as $c_{init}=2^{10}(7(ns+1)+l+1)(2N^{cell}_{ID}+1)+2N^{cell}_{ID}+N_{CP}$ in the beginning of each OFDM symbol. $N^{cell}_{ID}$ is the PCI (physical cell identity) of a cell, and in a normal CP, $N_{CP}=1$, and in the extended CP, $N_{CP}=0$.

In the sub-frame, a URS (UE-specific Reference Signal) is transmitted. Although the CRS is transmitted in the whole area of the sub-frame, the URS is transmitted in the data region of the sub-frame and is used for demodulating a corresponding PDSCH. In the drawings, 'R5' denotes the RE where the URS is transmitted. The URS is also referred to as a DRS (Dedicated Reference Signal).

The URS is transmitted only in an RB to which a corresponding PDSCH is mapped. Although in the drawings R5 is marked in the other region than the region where the PDSCH is transmitted, this aims to indicate the position of the RE to which the URS is mapped.

The URS is used only by a terminal receiving the corresponding PDSCH. The RS sequence $r_{ns}(m)$ for a US is the same as Equation 3. At this time, $m=0,1,\ldots,12N_{PDSCH,RB}-1$, where NPDSCH,RB is the number of RBs in the corresponding PDSCH transmission. The pseudo-random sequence generator is initialized as $c_{init}=(\text{floor}(ns/2)+1)(2N^{cell}_{ID}+1)2^{16}+n_{RNTI}$ at the beginning of each sub-frame. $n_{RNTI}$ is a terminal identifier.

In the foregoing, the case where the URS is transmitted through a single antenna is described. When the URS is transmitted through multiple antennas, the pseudo-random sequence generator is initialized as $c_{init}=(\text{floor}(ns/2)+1)(2N^{cell}_{ID}+1)2^{16}+n_{SCID}$ at the beginning of each sub-frame. $n_{SCID}$ is a parameter obtained from a DL grant (for example, DCI format 2B or 2C) related with PDSCH transmission.

Figure 4:
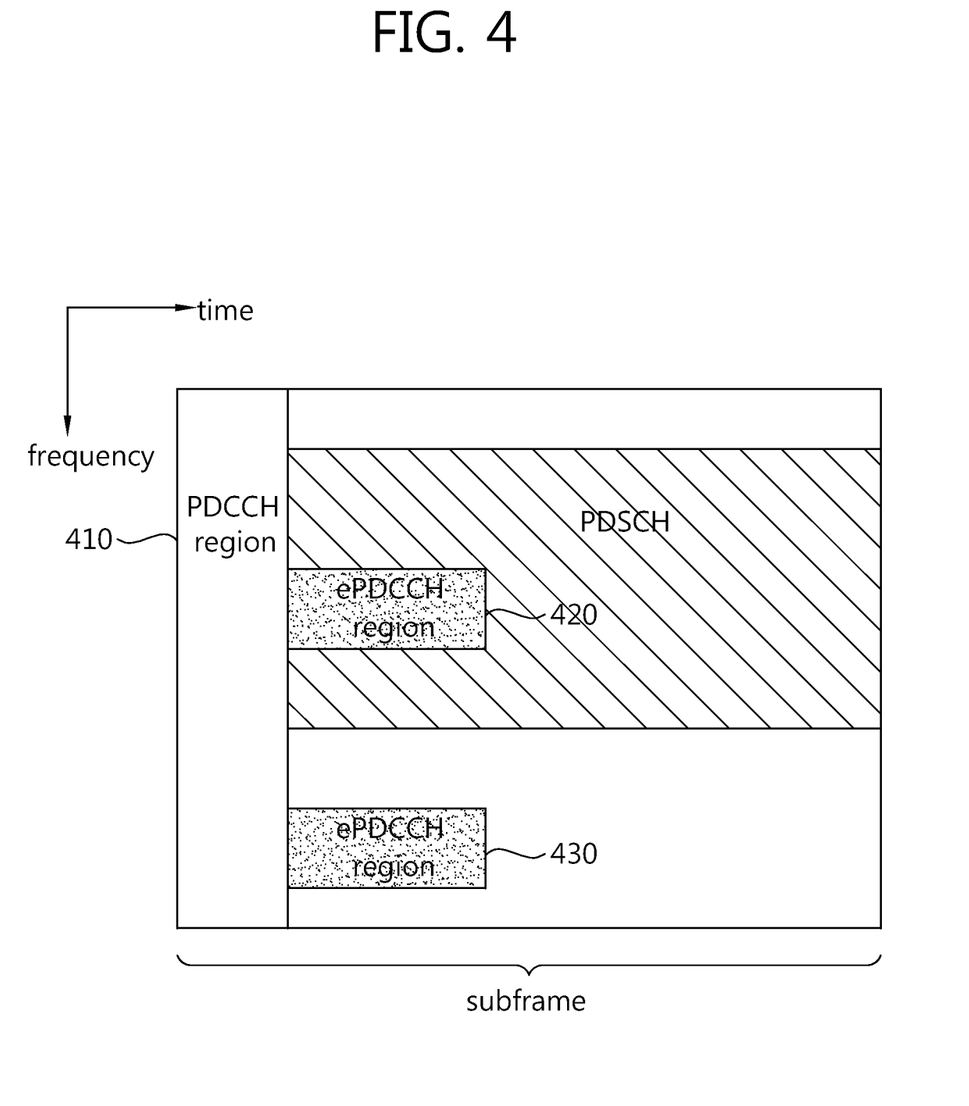
FIG. 4 shows an example of a sub-frame having an extended PDCCH.

FIG. 4 shows an example of a sub-frame having an extended PDCCH.

In the existing 3GPP LTE/LTE-A systems, a PDCCH for carrying various pieces of control information such as DL/UL scheduling are limited as transmitted only in the control region of the sub-frame, and accordingly, an introduction of ePDCCH which is scheduled more freely is currently in discussion. ePDCCH is also referred to as an enhanced-PDCCH.

A sub-frame includes a PDCCH region 410 for monitoring a PDCCH and one or more ePDCCH regions 420 and 430 for monitoring an ePDCCH.

The PDCCH region 410 is positioned in up to four, first OFDM symbols in the sub-frame, but the ePDCCH regions 420 and 430 may be flexibly scheduled in the data region.

In the PDCCH region 410, a PDCCH may be demodulated based on the CRS. In the ePDCCH regions 420 and 430, an ePDCCH may be demodulated based on the URS. The URS may be transmitted in a corresponding ePDCCH 420 and 430.

In the ePDCCH regions 420 and 430, blind decoding may be used to monitor an ePDCCH. Or, the ePDCCH might not be subject to blind decoding. The terminal may be previously aware of the positions or number of ePDCCHs in the ePDCCH regions 420 and 430 and may detect an ePDCCH in a designated position.

The ePDCCH regions 420 and 430 may be monitored by one terminal, terminal group or terminals in a cell. If a specific terminal monitors the ePDCCH regions 420 and 430, $n_{RNTI}$ or $n_{SCID}$ used for initializing the pseudo-random sequence generator of the URS may be acquired based on the specific terminal's identifier. If a terminal group monitors the ePDCCH regions 420 and 430, $n_{RNTI}$ or $n_{SCID}$ used for initializing the pseudo-random sequence generator of the URS may be obtained based on the identifier of the corresponding terminal group.

When the ePDCCH regions 420 and 430 are transmitted through multiple antennas, the ePDCCH regions 420 and 430 may be applied with the same precoding as the URS.

Since the ePDCCH is more flexible in scheduling than the PDCCH, it may be considered to transmit the ePDCCH region in the whole specific sub-frame. No PDCCH region is defined in the sub-frame.

Figure 5:
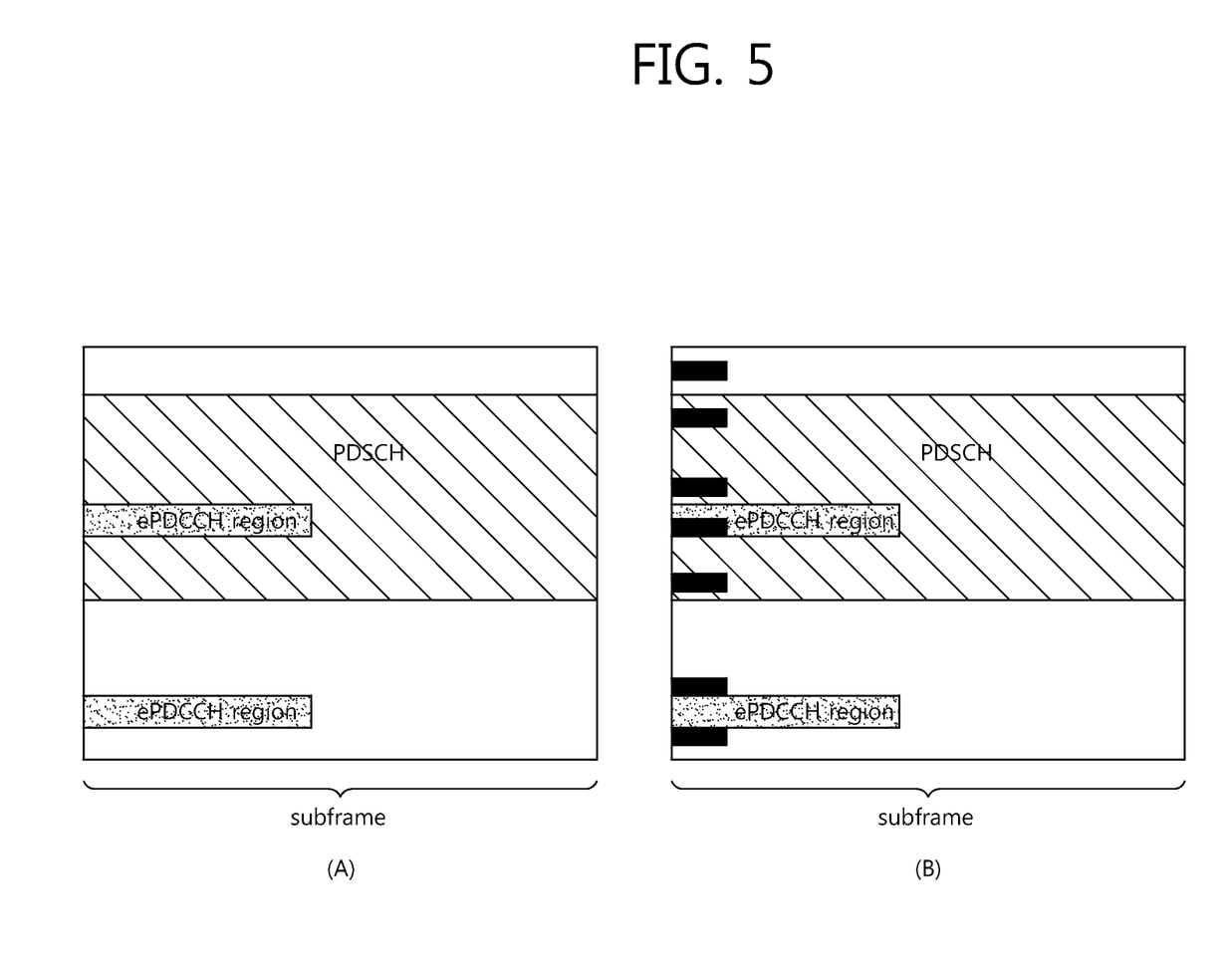
FIG. 5 shows an example of the structure of a sub-frame as suggested.

FIG. 5 shows an example of the structure of a sub-frame as suggested.

FIG. 5(A) illustrates an example where an ePDCCH region is defined from a first OFDM symbol in a sub-frame. FIG. 5(B) illustrates an example where an ePDCCH region is defined through the other region than an RE where a PHICH is transmitted.

In order to empty the RE where a PHICH is transmitted from the ePDCCH region, one of the following two methods may be adopted.

First, an ePDCCH code sequence may be generated without considering the RE of the PHICH. For example, assume that although 20 REs are allocated to the ePDCCH, four of the REs are used for the PHICH. Code sequences corresponding to the 20 REs are generated for the ePDCCH. Among the code sequences, a code sequence corresponding to four REs where the PHICH is transmitted are punctuated, and the punctuated code sequence may be mapped with only the 16 REs that are not used for the PHICH. Or, the code sequence is mapped with the 20 REs, and then, the four REs where the PHICH is transmitted are punctuated, and the PHICH may be mapped with the four REs.

Second, an ePDCCH may be mapped with the REs other than the REs for the PHICH. For example, assume that although 20 REs are allocated to an ePDCCH, four of the REs are used for the PHICH. A code sequence corresponding to 16 REs is generated, and the code sequence is mapped with the 16 REs. The PHICH may be mapped with the four REs where the PHICH is transmitted.

The sub-frame in which a PDCCH region and/or an ePDCCH region are defined is a sub-frame that provides backward compatibility with the existing LTE, and this is referred to as type-1 sub-frame or legacy sub-frame.

The sub-frame in which no PDCCH region is defined while only an ePDCCH region is defined is hereinafter referred to as type-2 sub-frame or extended sub-frame.

Although not shown in FIGS. 5(A) and (B), a PCFICH may be transmitted in the extended sub-frame as well. At this time, an ePDCCH code sequence may be mapped, avoiding itself from the RE of the PCFICH in the similar scheme to the case of the PHICH.

The terminal may demodulate a PDCCH and/or an ePDCCH using only the URS without the CRS in the extended sub-frame.

The URS may be transmitted in its corresponding ePDCCH region. The size, position, or antenna port of the ePDCCH region to be monitored by each terminal may be previously designated by RRC signaling of the base station. Or, the size, position, or antenna port of the ePDCCH region to be monitored by each terminal may be dynamically allocated through L1/L2 signaling or in a scheme implicitly associated with other information.

In order for demodulation of the PCFICH/PHICH and/or channel estimation, the CRS may be transmitted in the region (the first OFDM symbol or the first and second OFDM symbols in the extended sub-frame) where the PCFICH/PHICH is transmitted. Or, in order to prevent wrong channel estimation of the legacy terminals, the overall CRS may be transmitted in the extended sub-frame, as shown in FIG. 3.

The ACK/NACK signal may be transmitted through the control channel (which is denoted ePHICH (extended-PHICH) in the ePDCCH region, not the PHICH demodulated using the CRS. It benefits in that there is no need for a CRS for demodulation of the PHICH. The ePHICH may be demodulated using the URS. The terminal may receive the ePHICH through blind detecting. Or, the ePHICH may be mapped with part of the data region or the ePDCCH region. The ePHICH may be allocated per terminal or may be allocated to be shared by a plurality of terminals. When the ePHICH is allocated per terminal, the identifier (e.g., C-RNTI) of a corresponding terminal may be masked to the ePHICH. When the ePHICH is allocated per terminal group, the identifier of a corresponding terminal group may be masked to the ePHICH.

In order to reduce the burden that comes from the CRS transmission, one or more sub-frames in the radio frame may be designated as extended sub-frames. In the designated extended sub-frames, the terminal stops performing channel estimation or may only monitor the ePDCCH region.

A sub-frame having a special purpose may be designated as an extended frame. For example, an S (special) sub-frame in a TDD (time division duplex) system may be designated as an extended sub-frame. The CRS may be transmitted in the DwPTS (Downlink Pilot Time Slot) of the S sub-frame. Or, an MBSFN (Multicast-Broadcast Single Frequency Network) sub-frame may be designated as an extended sub-frame.

A sub-frame having a special purpose may be excluded from being designated as an extended frame. For example, since the sub-frame where SIB-1 or a PBCH is transmitted or the sub-frame where paging is transmitted needs PDCCH transmission, the sub-frames might not be set as extended sub-frames.

The extended sub-frame is not compatible with existing sub-frames, and thus, it needs to be informed to the terminal which sub-frame is an extended sub-frame.

In a first embodiment, the base station may dynamically designate an extended sub-frame. This is to designate an extended sub-frame per sub-frame or per sub-frame group. The indication information may be transmitted through a physical control channel such as PDCCH or PCFICH. For example, if the CIF of the PCFICH has a specific value (e.g., 0), a corresponding sub-frame may be an extended sub-frame.

In a second embodiment, all or some of the sub-frames in a specific serving cell may be designated as extended sub-frames. For example, a sub-frame of a secondary cell may be designated as an extended sub-frame.

In a third embodiment, the base station may statically designate an extended sub-frame. The base station may send out configuration information for designating an extended sub-frame on a per-sub-frame basis or on a per-radio frame basis, through an MAC message or RRC message.

Basically, considering the HARQ feature of operating per eight sub-frames, the extended sub-frame may be configured at the period of eight sub-frames. For example, if sub-frame n is an extended sub-frame, sub-frames n+8, n+16, . . . may be configured as extended sub-frames. Or, an extended sub-frame may be configured per sub-frames whose number is a multiple of eight. Or, since a radio frame includes 10 sub-frames, an extended sub-frame may be configured per 10 sub-frames or sub-frames whose number is a multiple of 10. Or, an extended sub-frame may be configured per sub-frames whose number is a common multiple of 8 and 10.

The above first to third embodiments may be implemented alone or in combination. For example, a pattern of a sub-frame in which an extended message is configured is designated with an RRC message, and this can be overridden through a PCFICH.

Figure 6:
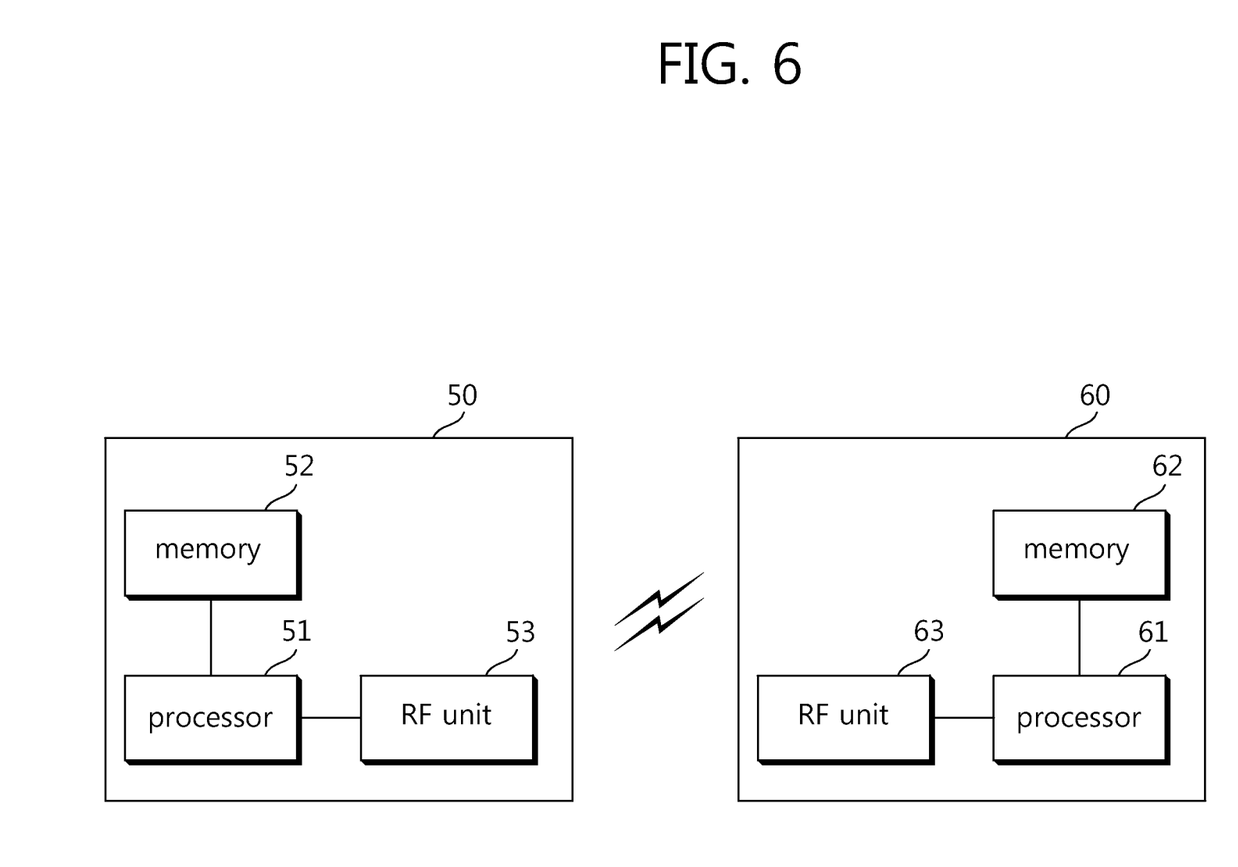
FIG. 6 is a block diagram illustrating a wireless communication system in which an embodiment of the present invention is implemented.

FIG. 6 is a block diagram illustrating a wireless communication system in which an embodiment of the present invention is implemented.

The base station 50 includes a processor 51, a memory 52, and an RF (radio frequency) unit 53. The memory 52 is connected with the processor 51 and stores various pieces of information to drive the processor 51. The RF unit 53 is connected with the processor 51 and transmits and/or receives radio signals. The processor 51 implements suggested functions, processes, and/or methods. In the above-described embodiments, the operation of the base station may be implemented by the processor 51.

The terminal 60 includes a processor 61, a memory 62, and an RF unit 63. The memory 62 is connected with the processor 61 and stores various pieces of information to drive the processor 61. The RF unit 63 is connected with the processor 61 and transmits and/or receives radio signals. The processor 61 implements suggested functions, processes, and/or methods. In the above-described embodiments, the operation of the terminal may be implemented by the processor 61.

The processor may include an ASIC (application-specific integrated circuit), other chipsets, a logic circuit and/or a data processing device. The memory may include an ROM (read-only memory), an RAM (random access memory), a flash memory, a memory card, a storage medium and/or other storage devices. The RF unit may include a base band circuit for processing a radio signal. When an embodiment is implemented in software, the above-described schemes may be realized in modules (processes, functions, etc.) for performing the above-described functions. The modules may be stored in the memory and executed by the processor. The memory may be positioned in or outside the processor and may be connected with the processor via various well-known means.

In the above exemplary system, the methods have been described in conjunction with flowcharts having a series of steps or blocks. However, the present invention is not limited to the order of the steps, and some steps may occur simultaneously or in an order different from the above-described steps. It may be understood by one of ordinary skill in the art that the steps in the flowcharts are not exclusive and some other steps may be added or one or more of the steps in the flowcharts may be deleted without affecting the scope of the present invention.

What is claimed is:

1. A method for monitoring a control region in a wireless communication system, the method comprising:

receiving, by a user equipment (UE), configuration information indicating at least one sub-frame among the plurality of sub-frames, wherein the at least one sub-frame includes an extended control region, and wherein the extended control region is included in a data region which exists in a whole orthogonal frequency division multiplexing (OFDM) symbol of the at least one sub-frame;

if the at least one sub-frame is a special sub-frame, receiving, by the UE, a cell-specific reference signal (CRS) in a downlink pilot time slot (DwPTS) of the special sub-frame, or if the at least one sub-frame is not the special sub-frame, receiving, by the UE, a UE-specific reference signal (URS) in the extended control region, wherein the CRS is used to estimate the extended control region by a whole UE in a cell, and wherein the URS is used to estimate the extended control region by a specific UE in the cell; and if the at least one sub-frame is the special sub-frame, monitoring, by the UE, the extended control region using the CRS, or if the at least one sub-frame is not the special sub-frame, monitoring, by the UE in a first OFDM symbol of the at least one sub-frame, the extended control region using the URS.

2. The method of claim 1, wherein the at least one sub-frame includes a plurality of OFDM symbols.

3. The method of claim 1, wherein a pseudo-random sequence used for generating the URS is initialized based on an identifier of the UE.

4. The method of claim 1, further comprising:

receiving indication information indicating whether there is the extended control region in the first OFDM symbol.

5. The method of claim 1, wherein the at least one sub-frame is repeated at the period of sub-frames whose number is a multiple of eight.

6. The method of claim 1, wherein the at least one sub-frame is repeated at the period of sub-frames whose number is a multiple of ten.

7. The method of claim 1, wherein the configuration information is received through an RRC (Radio Resource Control) message or an MAC (Medium Access Control) message.

8. A user equipment (UE) for monitoring a control region in a wireless communication system, the UE comprising:
  an RF (radio frequency) unit transmitting and receiving a radio signal; and
  a processor connected with the RF unit, wherein the processor is configured to:
    receive configuration information indicating at least one sub-frame of the plurality of sub-frames, wherein the at least one sub-frame includes an extended control region, and wherein the extended control region is included in a data region which exists in a whole orthogonal frequency division multiplexing (OFDM) symbol of the at least one sub-frame,
    if the at least one sub-frame is a special sub-frame, receive, by the UE, a cell-specific reference signal (CRS) in a downlink pilot time slot (DwPTS) of the special sub-frame, or if the at least one sub-frame is not the special sub-frame, receive, by the UE, a UE-specific reference signal (URS) in the extended control region, wherein the CRS is used to estimate the extended control region by a whole UE in a cell, and wherein the URS is used to estimate the extended control region by a specific UE in the cell, and
    if the at least one sub-frame is the special sub-frame, monitor, by the UE, the extended control region using the CRS, or if the at least one sub-frame is not the special sub-frame, monitor, by the UE in a first OFDM symbol of the at least one sub-frame, the extended control region using the URS.

9. The UE of claim 8, wherein the at least one sub-frame includes a plurality of OFDM symbols.

10. The UE of claim 8, wherein a pseudo-random sequence used for generating the URS is initialized based on an identifier of the UE.

11. The UE of claim 8, wherein the processor is further configured to:
  receive indication information indicating whether there is the extended control region in the first OFDM symbol.

* * * * *